United States Patent
Hashizume et al.

(10) Patent No.: US 12,497,427 B2
(45) Date of Patent: Dec. 16, 2025

(54) COMPOUND DERIVED FROM WATERMELON, AND COMPOSITION USING SAME

(71) Applicants: HAGIHARA FARM PRODUCTION INSTITUTE CO., LTD., Nara (JP); MIE UNIVERSITY, Mie (JP); NATIONAL UNIVERSITY CORPORATION TOKAI NATIONAL HIGHER EDUCATION AND RESEARCH SYSTEM, Aichi (JP)

(72) Inventors: Toshiharu Hashizume, Nara (JP); Tomohiro Itoh, Mie (JP); Mamoru Koketsu, Gifu (JP); Masayuki Ninomiya, Gifu (JP)

(73) Assignees: HAGIHARA FARM PRODUCTION INSTITUTE CO., LTD., Nara (JP); MIE UNIVERSITY, Mie (JP); NATIONAL UNIVERSITY CORPORATION TOKAI NATIONAL HIGHER EDUCATION, Aichi (JP)

( * ) Notice: Subject to any disclaimer, the term of this patent is extended or adjusted under 35 U.S.C. 154(b) by 906 days.

(21) Appl. No.: 17/619,081

(22) PCT Filed: Jun. 17, 2020

(86) PCT No.: PCT/JP2020/023685
§ 371 (c)(1),
(2) Date: Dec. 14, 2021

(87) PCT Pub. No.: WO2020/255989
PCT Pub. Date: Dec. 24, 2020

(65) Prior Publication Data
US 2022/0298196 A1 Sep. 22, 2022

(30) Foreign Application Priority Data

Jun. 17, 2019 (JP) ................................. 2019-111654
Jun. 17, 2020 (JP) ................................. 2020-104153

(51) Int. Cl.
*C07H 15/203* (2006.01)
*A23L 33/105* (2016.01)
(Continued)

(52) U.S. Cl.
CPC .......... *C07H 15/203* (2013.01); *A23L 33/105* (2016.08); *A61K 8/60* (2013.01); *A61Q 19/08* (2013.01)

(58) Field of Classification Search
None
See application file for complete search history.

(56) References Cited

U.S. PATENT DOCUMENTS

2007/0218150 A1   9/2007 Akashi et al.

FOREIGN PATENT DOCUMENTS

JP   2004-51492    2/2004
JP   2008-169194   7/2008
(Continued)

OTHER PUBLICATIONS

International Search Report (ISR) issued in International Patent Application PCT/JP2020/023685, dated Aug. 1, 2020, along with an English translation thereof.

*Primary Examiner* — Patrick T Lewis
(74) *Attorney, Agent, or Firm* — Greenblum & Bernstein, P.L.C.

(57) ABSTRACT

The compound that is contained in a young watermelon fruit and is represented by the formula (1) or formula (2) has an antioxidative effect and further has a skin anti-aging effect. Since these compounds are extracts from plants that are naturally edible, they are very safe for human bodies. Therefore, an antioxidative pharmaceutical composition, an antioxidative processed food composition, and an anti-skin aging composition, which contain these compounds as active ingredients, have high utility value as highly safe compositions.

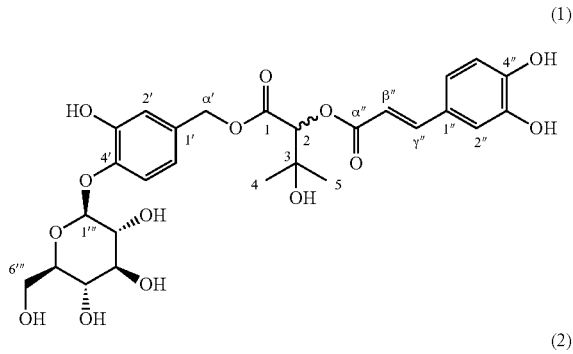

(1)

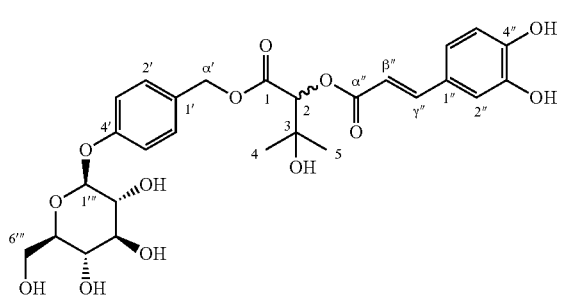

(2)

3 Claims, 7 Drawing Sheets
Specification includes a Sequence Listing.

(51) Int. Cl.
   *A61K 8/60*   (2006.01)
   *A61Q 19/08*  (2006.01)

(56)         References Cited

FOREIGN PATENT DOCUMENTS

JP      2011-021025     2/2011
JP      2012-106955     6/2012
JP      2016-020338     2/2016
JP      2016-175861     10/2016
JP      2020-002053     1/2020
KR      10-2018- 0010743     1/2018
WO      2005/105126     11/2005

SOLVENT PARTITION FLOWCHART OF YOUNG WATERMELON FRUIT EXTRACT (a)

(b)

(a)

(b)

COMPOUND DERIVED FROM WATERMELON, AND COMPOSITION USING SAME

FIELD

The present invention relates to a novel compound having an antioxidative effect derived from a watermelon, and a pharmaceutical composition, a processed food composition, and a skin anti-aging composition using the same.

BACKGROUND

In a living body, reactive oxygen is a substance required for energy production, attacks on foreign objects, and cell signal transduction. However, superoxide free radicals and the like are called reactive oxygen species and can act as toxic substances in the living body. The free radicals with unpaired electrons are strong oxidants. Furthermore, it is known that the free radicals cause oxidization of biological substances such as lipids, proteins, nucleic acids, and carbohydrates, thereby causing various effects on the living body.

For example, the free radicals reportedly have many effects on the progress of various chronic diseases such as atopic disease, cancer, high blood pressure, heart attack, arteriosclerosis, rheumatism, cataract, and Parkinson's disease, and the free radicals also act as a factor that weakens immune system functions.

On the other hand, antioxidative substances such as ascorbic acid and glutathione and antioxidative enzymes that repair defects caused by reactive oxygen, such as superoxide dismutase and catalase, are present in the living body and function as an in vivo defense system against reactive oxygen.

However, reactive oxygen is known to be produced in excess by smoking and stress, and there is an increasing demand for an antioxidant that assists the in vivo defense system. In particular, a substance which is naturally found in an established edible food product (a natural product) is confirmed as being sufficiently safe and thus preferable.

Patent Literature 1 discloses a novel compound that is a novel substance derived from currant leaves and has pharmacological activity, such as a suppression effect of diabetes modulators, such as α-glucosidase, an inhibition effect of the production of radicals, an anti-oxidation effect of LDL, and an inhibition effect of tyrosinase activity.

Furthermore, Patent Literature 2 discloses an antioxidative substance obtained by subjecting an olive leaf extract to a yeast treatment. Patent Literature 3 discloses a cyclohexane ketone extract of *Antrodia cinnamomea*, which can be applied to suppress the growth of tumor cells in breast cancer, hepatic cancer, and prostate cancer.

Some of the antioxidative substances have a skin anti-aging property. The skin anti-aging property is a property capable of preventing and mitigating wrinkles that occur on the skin. Among the wrinkles, a phenomenon called skin photoaging causes wrinkles upon irradiation of ultraviolet rays to the skin.

More specifically, skin photoaging is a phenomenon in which wrinkles and sagging occur on the skin by UV irradiation through, for example, a reduction in the expression of collagen caused by down-regulation of the expression of a single membrane-spanning serine/threonine receptor, namely, transforming growth factor-β receptor type II (TbRII), present on the cell membrane of fibroblasts and an attenuation of a transforming growth factor-β (TGF-β) signal pathway, which promotes the synthesis of type I pro-collagen, a precursor of collagen, and also through a non-cross-linking bond formation in collagen described below.

A mechanism for forming the non-cross-linking bonds in collagen is thought as follows. *Propionibacterium acnes* (*P. acnes*) living in the sebaceous gland of the skin, the oral cavity, the stomach and intestines, and the like, produces protoporphyrin IV, which serves as a photosensitive substance as a final product in the C5 pathway that converts glutamic acid to aminolevulinic acid. This protoporphyrin IV absorbs UV irradiated to the skin and produces singlet oxygen ($^1O_2$), thereby oxidizing histidine, one of the amino acids constituting collagen.

As a result, non-cross-linking bonds in collagen are formed and the elasticity of the skin is reduced, causing skin aging such as wrinkles. Furthermore, in a living body, a photosensitive substance such as porphyrin produces not only singlet oxygen ($^1O_2$), but also other reactive oxygen species (hereinafter referred to as ROS) including superoxide ($\cdot O_2^-$) and hydroxyl radical ($\cdot OH$).

These ROS activate apotosis signal-regulating kinase 1 (ASK1) of the oxidative stress responsive mitogen-activated protein 3 kinase (MAP3K), and cause over-production of inflammatory cytokines such as tumor necrosis factor-a (TNF-a) and interleukin-6 (IL-6), thereby causing an inflammatory response in the skin.

This inflammatory response up-regulates the expression of transient receptor potential vanilloid type 1 (TRPV1), which is a six transmembrane spanning ion channel receptor present on the cell membrane of epidermal cells, and increases the amount of $Ca^{2+}$ flowing into the cells, thereby inducing the expression of matrix metallo proteinase-1 (hereinafter referred to as MMP-1) that cleaves collagen.

As a result, collagen is cleaved and symptoms of skin aging such as wrinkles and sagging develop on the skin.

Furthermore, collagen fragments generated by cleavage of collagen by MMP-1 activate vitronectin receptor ($\alpha_v\beta_3$) of an integrin family and inhibit phosphorylation of cofilin via a low molecular weight GTP (guanosine triphosphate)-binding protein, Ras homolog kinase (ROCK). Consequently, there occurs an attenuation of a downstream signaling pathway involving phosphorylated extracellular signal-regulated kinase 1/2 (ERK1/2) of a mitogen-activated protein kinase (MAPK) family and a transcription factor ELK-1, and there also occurs a reduction of the expression of hyaluronan synthase 2 (HAS2).

As a result, the synthesis of hyaluronic acid, which is capable of holding moisture in the skin is inhibited, causing skin aging such as wrinkles and sagging on the skin. Note that Patent Literature 4 can be mentioned as the invention in which an anti-wrinkle effect is obtained by inhibiting MMP.

CITATION LIST

Patent Literature

Patent Literature 1: Japanese Patent Application Laid-Open No. 2016-020338

Patent Literature 2: Japanese Patent Application Laid-Open No. 2011-021025

Patent Literature 3: Japanese Patent Application Laid-Open No. 2008-169194

Patent Literature 4: Japanese Patent Application Laid-Open No. 2020-002053

SUMMARY

Technical Problem

As described above, a substance having an antioxidative property and known to be safe is expected to be effective in various diseases and health maintenance from the standpoint of wanting to protect a living body. The inventors have many years of experience and work in production tests of watermelons, and it is an object of the present invention to provide an antioxidative substance derived from a watermelon.

Solution to Problem

In consideration of the aforementioned problems, the present invention has been completed by confirming that a previously unknown novel compound obtained by extracting substances contained in a young watermelon fruit has an antioxidative effect.

More specifically, the antioxidative compound (the novel compound) according to the present invention is represented by the formula (1) or the formula (2).

[Chemical formula 1]

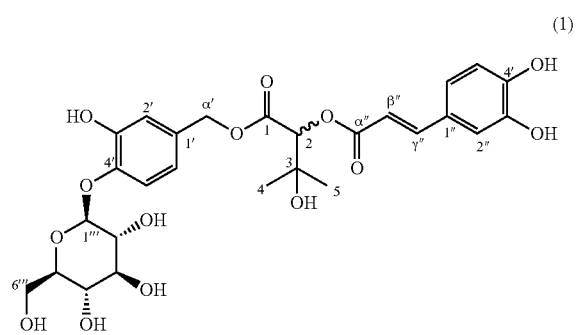

(1)

[Chemical formula 2]

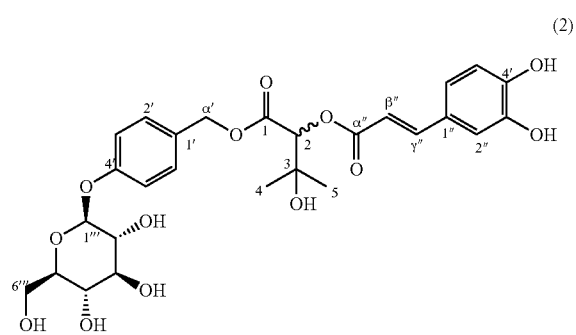

(2)

Advantageous Effects of Invention

The compounds of the formula (1) and the formula (2) are novel substances extracted from a young watermelon fruit, are highly safe, and have an antioxidative effect. Thus, it is expected that these compounds can be applied to a pharmaceutical composition, a processed food composition, and the like for removing radicals in a living body. More specifically, it is expected that these compounds can be generally effective in preventing aging and can have effects in preventing or palliating lifestyle diseases such as arteriosclerosis and cancer, preventing or mitigating gray hairs and skin aging such as spots and wrinkles, and the like.

In particular, specific effects were confirmed in an antioxidative pharmaceutical composition, an antioxidative processed food composition, and a skin anti-aging composition.

DESCRIPTION OF EMBODIMENTS

Examples of the compounds according to the present invention, and a pharmaceutical composition, a processed food composition, and a skin anti-aging composition containing the compound(s) as an active ingredient will be described below. The following description exemplifies an embodiment and an example of the present invention, and the present invention is not limited to the following description. The following description may be modified without departing from the spirit of the present invention.

The compounds according to the present invention are characterized by being represented by the formula (1) or the formula (2).

[Chemical formula 3]

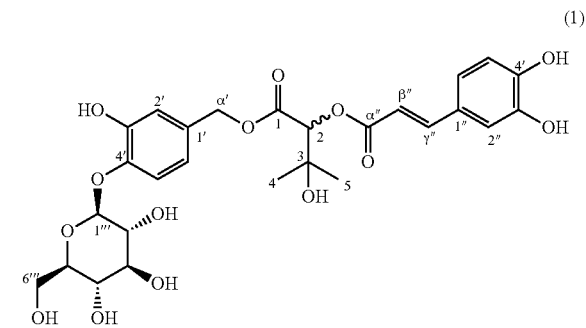

(1)

-continued

[Chemical formula 4]

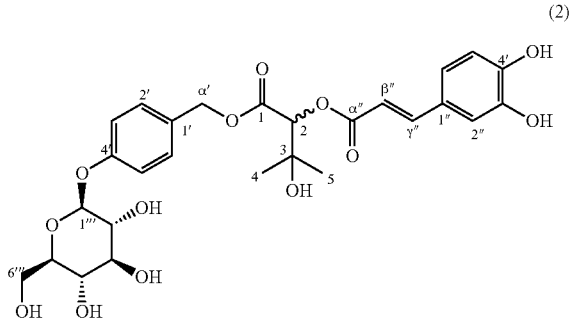

(2)

(1) A compound of the formula (1) is 2-caffeoyl-3-hydroxy-3-methylbutyric 4'-β-D-glucopyranosyloxy-3'-hydroxybenzyl ester, and it is abbreviated to "4G3HBE" and also referred to as "Citrulluside H". Hereinafter, it is referred to as "4G3HBE".

Furthermore, a compound of the formula (2) is 2-caffeoyl-3-hydroxy-3-methylbutyric 4'-β-D-glucopyranosyloxybenzyl ester, and it is abbreviated to "4GBE" and also referred to as "Citrulluside T". Hereinafter, it is referred to as "4GBE".

4G3HBE and 4GBE can be obtained from a young watermelon fruit. A watermelon (scientific name: Citrullus lanatus) is a fruit of an annual climbing plant of the Cucurbitaceae family. A young fruit refers to a fruit between 10 and 20 days from fruit bearing to fruit maturing. Varieties of the fruit are not particularly limited. However, a red flesh large variety, a seedless red flesh variety, a black variety, an oblong-shape variety, a yellow flesh variety, and an orange variety are preferably used.

Figure 1:
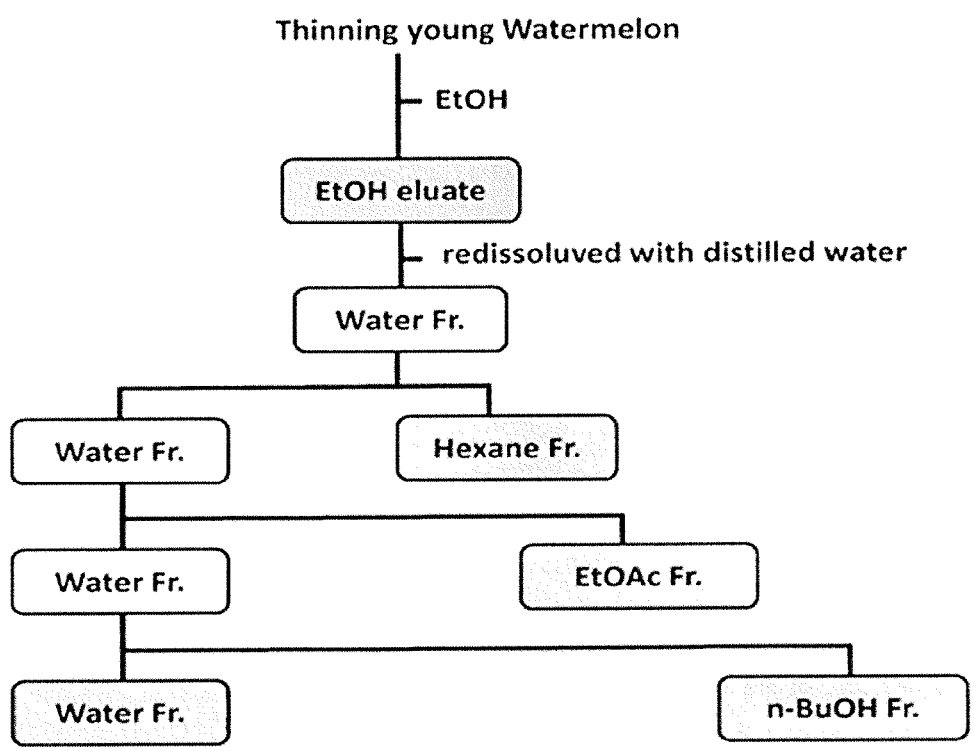
FIG. 1 is a solvent partition flowchart for obtaining extract from a young watermelon fruit.

FIG. 1 shows a solvent partition flowchart of young watermelon fruit extract. In an extraction method, the young watermelon fruit is washed and crushed, and then the crushed matter is immersed in ethanol to obtain an ethanol extract. The ethanol extract was subjected to solvent partition to prepare fractions, namely, a hexane-soluble fraction (Hexane Fr.), an ethyl acetate-soluble fraction (EtOAc Fr.), a butanol-soluble fraction (n-BuOH Fr.), and a distilled water-soluble fraction (Water Fr.). Subsequently, the ethyl acetate extract was subjected to column fractionation to isolate and obtain two novel compounds described above.

A pharmaceutical composition according to the present invention has been achieved on the basis of the finding that 4G3HBE and 4GBE have an antioxidative effect. Thus, the pharmaceutical composition according to the present invention is an antioxidative pharmaceutical composition including at least one of 4G3HBE and 4GBE.
These compounds may be converted to salts by mixing them with pharmaceutically acceptable acids in a solvent such as water, methanol, ethanol, or acetone. Examples of the pharmaceutically acceptable acids include inorganic acids such as hydrochloric acid, hydrobromic acid, a salt of sulfuric acid, phosphoric acid, nitric acid, and organic acids such as acetic acid, propionic acid, oxalic acid, succinic acid, lactic acid, malic acid, tartaric acid, citric acid, maleic acid, fumaric acid, methane sulfonic acid, p-toluene sulfonic acid, and ascorbic acid.

These compounds can be administered orally or parenterally (e.g., intravenously, subcutaneously or intramuscularly, locally, rectally, percutaneously, or transnasally).

The pharmaceutical composition for oral administration can be prepared by including a pharmaceutically acceptable and commonly used excipient, binder, lubricant, disintegrant, surfactant, fluidity promoter, or the like. As the excipient lactose, fructose, glucose, corn starch, sorbitol, crystalline cellulose or the like may be used.

As the binder, methyl cellulose, ethyl cellulose, gum arabic, gelatin, hydroxypropyl cellulose, polyvinylpyrrolidone or the like may be used. As the lubricant, talc, magnesium stearate, polyethylene glycol, hydrogenated vegetable oil or the like may be suitably used.

As the disintegrant, starch, sodium alginate, gelatin, calcium carbonate, calcium citrate, dextrin, magnesium carbonate, synthetic magnesium silicate or the like may be used. As the surfactant, sodium lauryl sulfate, soybean lecithin, a sucrose fatty acid ester, polysorbate 80 or the like may be used.

As the fluidity promoter, light anhydrous silicic acid, dry aluminum hydroxide gel, synthetic aluminum silicate, magnesium silicate or the like may be used. As other additives, syrup, vaseline, glycerin, ethanol, propylene glycol, citric acid, sodium chloride, sodium nitrite, sodium phosphate or the like may also be used.

Any dosage form according to the administration form can be adopted. Various kinds of the preparations including an oral administration agent such as a capsule, a tablet, a granule, a powder, a pill, or a fine granule, a parenteral administration agent such as an injection, a rectal administration agent, a hydrophobic suppository, a hydrophilic suppository, and the like can be adopted. Furthermore, the pharmaceutical composition of the present invention may include other pharmacologically active components in addition to the above-described compounds of the present invention.

The antioxidative pharmaceutical composition according to the present invention can be used as a therapeutic agent for a known symptom which is expected to be palliated by antioxidative activity. Example thereof include cardiovascular disease, atopic disease, cancer, rheumatism, cataract, and Parkinson's disease.

The compound according to the present invention can be provided as a processed food composition. The processed food composition according to the present invention can be also called an antioxidative processed food composition. Examples of the processed food composition include not only general processed foods including articles of taste and healthy foods such as a candy, a gum, jelly, a biscuit, a cookie, a rice cracker, bread, noodle, fish- and meat-paste products, a tea, a refreshing beverage, a coffee beverage, a milk beverage, a whey beverage, a lactic acid bacteria beverage, yogurt, ice cream, and pudding, but also foods with health claims such as foods for specified health uses and foods with nutrient function claims defined by the food with health claims system of the Ministry of Health, Labour and Welfare. The processed food composition further includes a dietary supplement, feedstuff, a food additive, and the like.

Furthermore, the compounds according to the present invention can be provided as a skin anti-aging composition. As the skin anti-aging composition, at least one of the compounds according to the present invention may be used as it is, or may be used together with a component(s) used in an ordinary external medicine other than active components in the ordinary external medicine. Note that the skin anti-aging composition may overlap with the pharmaceutical composition described above.

Examples of other components which can be suitably used include a polymer, a protein and a hydrolysate thereof, and a mucopolysaccharide. Examples of the polymer include a carboxyvinyl polymer, xanthan gum, and sodium alginate, without being limited thereto.

Examples of the protein and the hydrolysate thereof include collagen, elastin, keratin, casein, a hydrolysate thereof, a salt of the hydrolysate, an ester of the hydrolysate, and an enzyme-treated product thereof. Collagen is particularly preferable because the production of collagen is inhibited by ultraviolet rays.

Examples of the mucopolysaccharide include chondroitin sulfate, hyaluronic acid, dermatan sulfate, heparan sulfate, mucoitin sulfate, heparin and a derivative thereof, and a salt thereof. Chondroitin sulfate, hyaluronic acid, and a sodium salt thereof are particularly preferable. In particular, synthesis of hyaluronic acid is inhibited, and thus hyaluronic acid is desirably used together with the skin anti-aging composition.

To the extent that the effects of the skin anti-aging composition are not impaired, a moisturizing agent, a water-soluble polymer, an oil component, a colorant, an antioxidant, a metal chelating agent, a preservative, a pH adjuster, a refreshing agent, a fragrance, an ultraviolet ray absorbing/scattering agent, or the like may be added to the skin anti-aging composition.

Note that the skin anti-aging composition is not prohibited from being provided as a skin anti-aging pharmaceutical composition or a skin anti-aging processed food composition.

EXAMPLES

<Compound Extraction Method>

A young fruit of a watermelon of a CS variety (15 days after fruit bearing) in an amount of 2 kg (wet weight) was crushed, and 5 L of ethanol was added to this crushed matter. The resulting mixture was stirred at normal temperature to prepare an ethanol eluate.

The ethanol eluate was subjected to a solvent partition method using hexane, ethyl acetate, and butanol in this order to prepare corresponding elution fractions and a fraction dissolved in distilled water. An ethyl acetate layer was subjected to column purification to obtain a plurality of fractions. Two novel compounds were obtained from two of these fractions.

Substance Identification

Two novel substances thus extracted were subjected to NMR to determine their structures.

2-Caffeoyl-3-hydroxy-3-methylbutyric 4'-β-D-glucopyranosyloxy-3'-hydroxybenzyl ester):
$^1$H NMR (400 MHz, Acetone-$d_6$): δ 7.63 (1H, d, J=15.6Hz, H-γ"), 7.16 (1H, d, J=1.8 Hz, H-2"), 7.12 (1H, d, J=8.2 Hz, H-5'), 7.03 (1H, dd, J=8.2 and 1.8 Hz, H-6"), 6.91 (1H, d, J=2.3 Hz, H-2'), 6.85 (1H, d, J=7.8 Hz, H-5"), 6.80 (1H, d, J=8.2 and 2.3 Hz, H-6'), 6.35 (1H, d, J=16.0 Hz, H-β"), 5.07 (2H, s, H-α'), 4.85 (1H, s, H-2), 4.74 (1H, d, J=7.3 Hz, H-1'''), 3.92-3.84 (1H, m, H-6α'''), 3.73-3.68 (1H, m, H-6β'''), 3.52-3.43 (4H, m, H-2''', H-3''', H-4''', and H-5'''), 1.31 (3H, s, H-4), 1.30 (3H, s, H-5); $^{13}$C NMR (100 MHz, Acetone-$d_6$): δ 168.5, 166.3, 148.3, 147.9, 146.1, 145.6, 145.3, 131.9, 126.6, 122.0, 119.6, 118.4, 116.0, 115.6, 114.5, 113.8, 103.4, 79.3, 77.2, 76.6, 73.9, 70.5, 70.4, 66.1, 61.7, 25.8 (2C);

HRESITOFMS: m/z 603.1678 [M+Na]$^+$ (calcd. for $C_{27}H_{32}O_{14}$Na, 603.1690).

The foregoing data showed that one of the novel substances was 4G3HBE of the formula (1).

2-Caffeoyl-3-hydroxy-3-methylbutyric 4'-β-D-glucopyranosyloxybenzyl ester):
$^1$H NMR (400 MHz, Acetone-$d_6$): δ 7.63 (1H, d, J=16.0 Hz, H-γ"), 7.31 (2H, d, J=8.7 Hz, H-2' and H-6'), 7.16 (1H, d, J=1.8 Hz, H-2"), 7.05-7.00 (3H, m, H-3', H-5', and H-6"), 6.85 (1H, d, J=8.3 Hz, H-5"), 6.35 (1H, d, J=16.0 Hz, H-β"), 5.11 (2H, s, H-α'), 4.94 (1H, d, J=7.8 Hz, H-1'''), 4.84 (1H, s, H-2), 3.89-3.84 (1H, m, H-6α'''), 3.72-3.65 (1H, m, H-6α'''), 3.53-3.42 (4H, m, H-2''', H-3''', H-4''', and H-5'''), 1.30 (3H, s, H-4), 1.28 (3H, s, H-5); $^{13}$C NMR (100 MHz, Acetone-$d_6$): δ 168.5, 166.3, 157.9, 148.3, 146.2, 145.6, 129.8 (2C), 129.6, 126.6, 122.0, 116.4 (2C), 115.6, 114.5, 113.8, 100.9, 79.3, 77.1, 76.9, 73.8, 70.5, 70.4, 66.0, 61.8, 25.7 (2C);

HRESITOFMS: m/z 587.1716 [M+Na]$^+$ (calcd. for $C_{27}H_{32}O_{13}$Na, 587.1741).

The foregoing data showed that the other novel substance was 4GBE of the formula (2).

Antioxidative Effect

In order to evaluate the antioxidation ability of the two novel compounds thus isolated, 200 μM DPPH (1,1-diphenyl-2-picrylhydrazyl) dissolved in 50% ethanol was prepared as a reagent. In the preparation procedure of the reagent, DPPH was first dissolved in ethanol, and an equal amount of Milli-Q water was then added to the mixture. Then, the resulting mixture was filtered with a 0.45 μm syringe filter to remove undissolved matters.

A sample solution in a volume of 150 μL and the 200 μM DPPH ethanol solution in a volume of 150 μL were mixed well in a 96-well plate. After the plate was left standing still for 30 minutes, the absorbance at 520 nm was measured using a microplate reader (Thermo Fisher Scientific, Multiscan-LUX). The radical scavenging rate was obtained using the formula (F1).

[Mathematical formula 1]

$$RD(\%) = \left\{ \frac{OD_{blank520nm} - OD_{sample520nm}}{OD_{blank520nm}} \right\} \times 100 \quad (F1)$$

Note that in the formula, RD (%) represents the radical scavenging rate (%). $OD_{blank520nm}$ represents the absorbance at 520 nm of the reagent (DPPH) to which each of the sample solutions is not added, while $OD_{sample520nm}$ represents the absorbance at 520 nm of the reagent (DPPH) to which each of the sample solutions is added and mixed, followed by being left standing still for 30 minutes.

Figure 2:
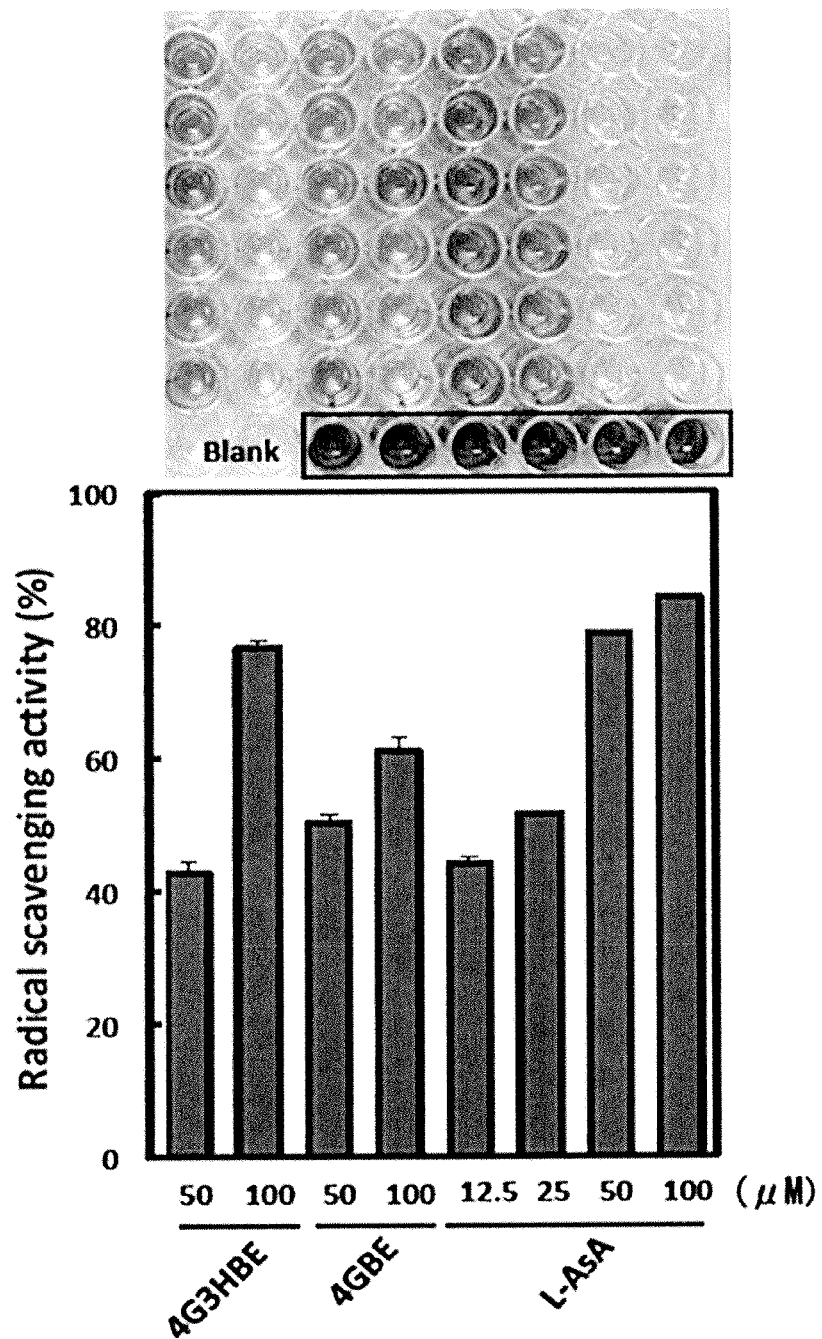
FIG. 2 is a graph showing a result of obtaining a radical scavenging rate of two novel compounds extracted and isolated from a young watermelon fruit, with a photograph showing a state of a microplate.

The result is shown in FIG. 2. FIG. 2 is a graph of the result with a photograph of a state of the microplate. In the graph in FIG. 2, the horizontal axis indicates the type of the sample solutions with concentrations (mM) and the vertical axis indicates the radical scavenging rate (indicated as "Radical scavenging activity(%)").

As the type of the sample solutions, 4G3HBE represents 2-caffeoyl-3-hydroxy-3-methylbutyric 4'-β-D-glucopyranosyloxy-3'-hydroxbenzyl ester and 4GBE represents 2-caffeoyl-3-hydroxy-3-methylbutyric 4'-β-D-glucopyranosyloxybenzyl ester.

L-AsA represents L-ascorbic acid. L-ascorbic acid (vitamin C) is known as a substance having an antioxidative effect.

4G3HBE and 4GBE had an antioxidative activity approximately half that of vitamin C having strong antioxidation ability.

Skin Anti-Aging Effect

The skin anti-aging effect of 4G3HBE and 4GBE was verified in the following 5 categories.
(1) Inhibition of MMP-1 expression
(2) Activation (phosphorylation) of signaling molecules of p38MAP, SAPK/JNK, and NK-κB contributing to production of MMPs
(3) AP-1 transactivation downstream of the signaling pathway from (2)
(4) Effect on amount of intracellular reactive oxygen species (ROS)
(5) Effect on production of carbonylated proteins

Inhibition of MMP-1 Expression

UV irradiation to the skin causes an inflammatory response in the skin and, as a result, the expression of MMP-1 (matrix metalloproteinase) cleaving collagen is up-regulated, thereby causing a phenomenon of skin aging. Thus, the ability of 4G3HBE and 4GBE according to the present invention to inhibit the expression of MMP-1 was examined.

Normal human dermal fibroblasts-Neo (NHDF, hereinafter, simply referred to as "NHDF cells") were adjusted at 1×10⁵ cells/mL and inoculated in a 12-well multi-well plate in a volume of 1 mL each and cultured to a confluent state. Subsequently, test samples (a final concentration of 50 or 100 µM (of each solvent-fractionated matter) (of each isolated substance)) were added to the cells and the cells were precultured for 24 hours. Subsequently, after rinsing with PBS twice, the cells were irradiated with UV-B with a light intensity of 25 mJ/cm².

The cells irradiated with ultraviolet rays were subjected to SDS-PAGE after 24 hours, and then western blotting was performed by transferring to PVDF (polyvinylidene difluoride), thereby detecting protein expression of MMP-1.

Further, the NHDF cells were cultured in the same manner as described above and irradiated with UV-B with a light intensity of 25 mJ/cm². The total RNAs were extracted from the irradiated cells (a total RNA solution) and converted to cDNAs by reverse transcription using a reverse transcriptase solution having the composition in Table 1 using the High-Capacity RNA-to-cDNA Kit (Applied Biosystems, Thermo Ficher Scientific). In Table 1, "total RNA solution" refers to the total RNA solution.

TABLE 1

| Reagents | Volume (µL) |
| --- | --- |
| 2 X RT Buffer mix | 10 |
| 20 X Enzyme mix | 1 |
| total RNA solution | 1 |
| Nuclease free water | 8 |
| Total | 20 |

Then, the expression level of genes (MMP-1 and MMP-3) was examined by real-time PCR. The primers shown in Table 2 were used. Further, the composition of a real-time PCR reaction solution is shown in Table 3. A housekeeping gene (GAPDH) was used as a control.

TABLE 2

| Primers | Sequence | SEQ ID NO |
| --- | --- | --- |
| MMP-1 forward primer: | 5' CCAAATGGGCTTGAAGCTG 3' | 1 |
| MMP-1 reverse primer | 5' GGTATCCGTGTAGCACATTCTGTC 3' | 2 |
| MMP-3 forward primer: | 5' TTTCCAGGGATTGACTCAAAGA 3' | 3 |
| MMP-3 reverse primer | 5' AAGTGCCCATATTGTGCCTTC 3' | 4 |
| GAPDH forward primer | 5' GCACCGTCAAGGCTGAGAAC 3' | 5 |
| GAPDH reverse primer | 5' TGGTGAAGACGCCAGTGGA 3' | 6 |

TABLE 3

| Reagents | Volume (µL) |
| --- | --- |
| Master mix | 10 |
| Nuclease free water | 6.4 |
| Primer (Forward) | 0.8 |
| Primer (Reverse) | 0.8 |
| cDNA sample | 2 |
| Total | 20 |

Figure 3:
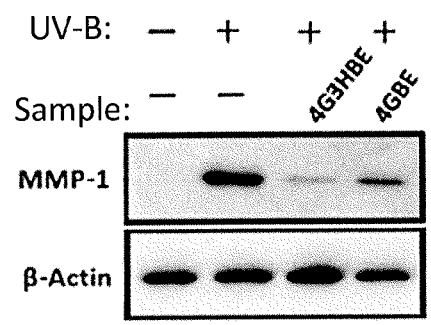
FIG. 3 shows (a) a result of western blotting for examining inhibition of MMP-1 expression and (b) a graph showing a gene expression ratio by real-time PCR.
Figure 3:
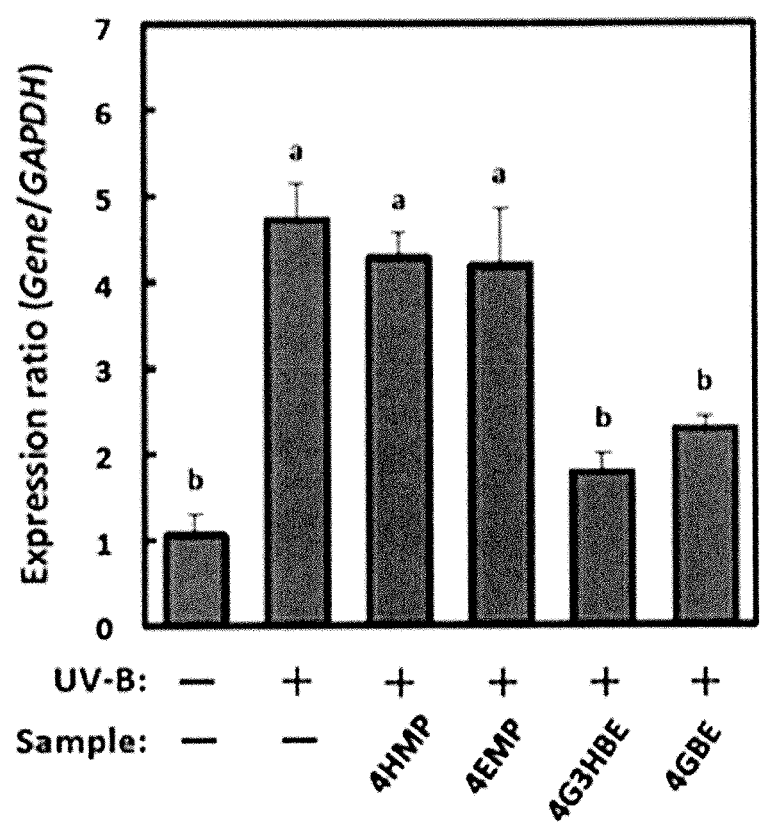

The result is shown in Table 3. FIG. 3(a) is a photograph of the western blotting and FIG. 3(b) shows a graph of a gene expression ratio.

Referring to FIG. 3(a), in two columns in an upper part of the photograph, an upper column indicates the presence/absence of UV irradiation ("+": irradiated with UV, "−": not irradiated) and a lower column indicates samples (no sample indicated by "−", 4G3HBE, and 4GBE). Further, a left part of the photograph indicates detection targets (MMP-1 and β-Actin) along a vertical direction. β-Actin is measured as a control.

4G3HBE and 4GBE had the weaker detection intensity of MMP-1 and clearly suppressed the expression of MMP-1.

In FIG. 3(b), the horizontal axis indicates the presence/absence of UV irradiation and the samples and the vertical axis indicates an expression ratio of genes (MMP-1 and MMP-3) with respect to the housekeeping gene (GAPDH) (Gene/GAPDH).

The expression of MMP-1 increased about 4.8-fold by UV irradiation with respect to the housekeeping gene. On the other hand, 4G3HBE and 4GBE suppressed the expression of MMP-1 to about 1.8- to 2.2-fold. This test was able to confirm that 4G3HBE and 4GBE suppressed the expression of MMP-1.

Activation of Signaling Molecule

Since activation of p38MAP kinase, SAPK/JNK, and NF-κB involving in an inflammatory response is deeply involved in the induction and production of MMPs after UV-B irradiation, activation (via phosphorylation) of these signaling molecules was studied by the western blotting method.

More specifically, the NHDF cells were precultured for 24 hours in the same manner as described above, rinsed with PBS twice, irradiated with UV-B with a light intensity of 25 mJ/cm$^2$, and subjected to western blotting to examine phosphorylation of p38MAP, SAPK/JNK, and NF-κB.

Figure 4:
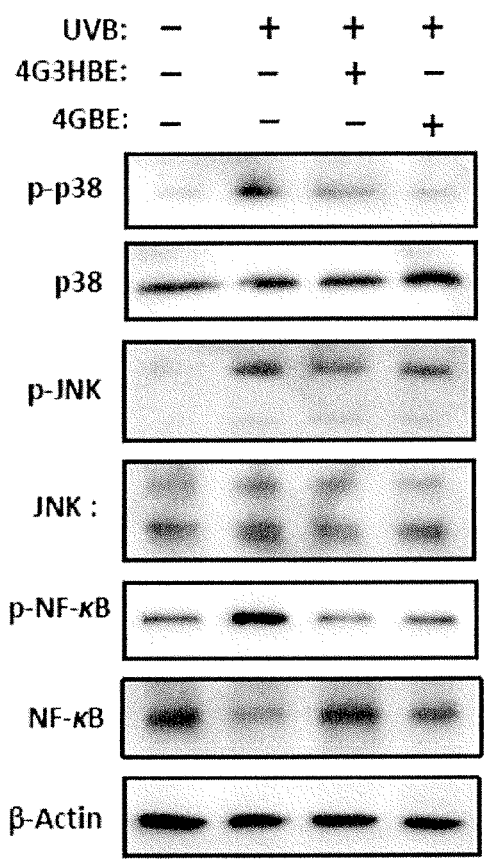
FIG. 4 shows (a) a result of western blotting for examining activation of signaling molecules and (b) a graph showing a result of a densitometry analysis.
Figure 4:
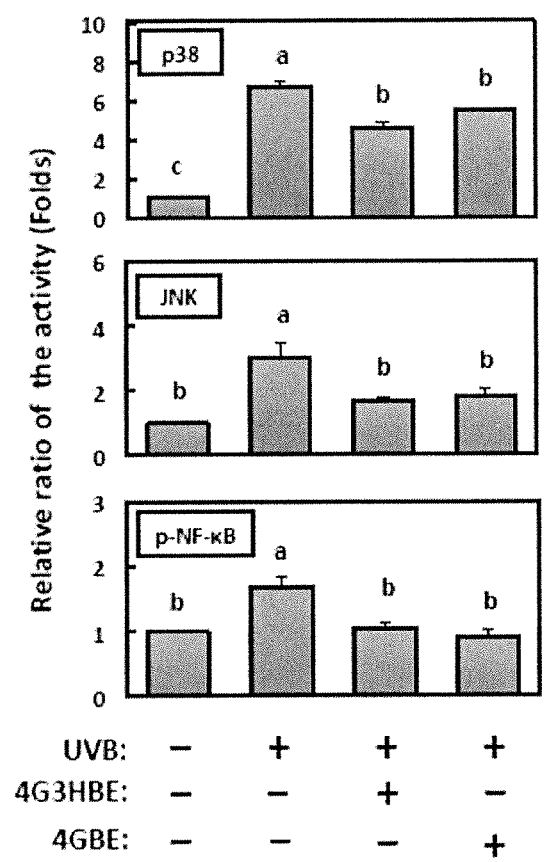

The result is shown in FIG. 4. FIG. 4(a) is an image of a western blot and FIG. 4(b) shows a result in which changes in phosphorylation before and after UV irradiation were analyzed by densitometry. The data were shown by average±standard error (n=3). The comparison between multiple groups was performed by using the Tukey-Kramer test method ($p<0.05$).

Referring to FIG. 4(a), three columns in an upper part of the photograph indicates, from the top, the presence/absence of UV irradiation ("+": irradiated with UV, "−": not irradiated), the presence/absence of 4G3HBE ("+": presence, "−": absence), and the presence/absence of 4GBE ("+": presence, "−": absence).

In the result photograph, "p38", "JNK:", and "NF-κB" indicate p38MAP, SAPK/JNK, and NF-κB, respectively. Furthermore, "p-p38", "p-JNK", and "p-NF-κB" respectively indicate their phosphorylated products. b-Actin was measured at the same time as a control.

Referring to FIG. 4(b), the horizontal axis of the graph indicates conditions of the samples, that is, the presence/absence of UV-B irradiation ("+": irradiated with UV, "−": not irradiated), the presence/absence of 4G3HBE ("+": presence, "−": absence), and the presence/absence of 4GBE ("+": presence, "−": absence). Further, the vertical axis indicates changes in phosphorylation, that is, a relative ratio of phosphorylation activity. Referring to FIG. 4(b), p38MAP, SAPK/JNK, and phosphorylated NF-κB increased by UV-B irradiation. However, the expression of the signaling molecules was suppressed by the presence of 4G3HBE or 4GBE.

Based on the above-mentioned facts, activation of p38MAP kinase, SAPK/JNK, and NF-κB was significantly down-regulated in the cells treated with 4G3HBE or 4GBE.

AP-1 Transactivation

It was suggested that activation of p38MAP kinase, SAPK/JNK, and NF-κB involving in an inflammatory response after UV-B irradiation was attenuated by the 4G3HBE or 4GBE treatment. Thus, next, transactivation of a downstream factor, activator protein-1 (AP-1), was studied by a luciferase reporter assay.

After both pGL4.44 [Luc2P/AP-1-RE/Hygro] and pRL-SV40 (Renilla luciferase) were introduced in the NHDF cells, 4G3HBE and 4GBE were each added to the cells at a final concentration of 50 μM, followed by culturing for 24 hours. After culturing, the cells were irradiated with UV-B with a light intensity of 25 mJ/cm$^2$ and then cultured for 12 hours.

These cells were lysed to measure the light emission intensity of Renilla luciferase inserted in pRL-SV40 by a luminometer. The result is shown in FIG. 5.

Figure 5:
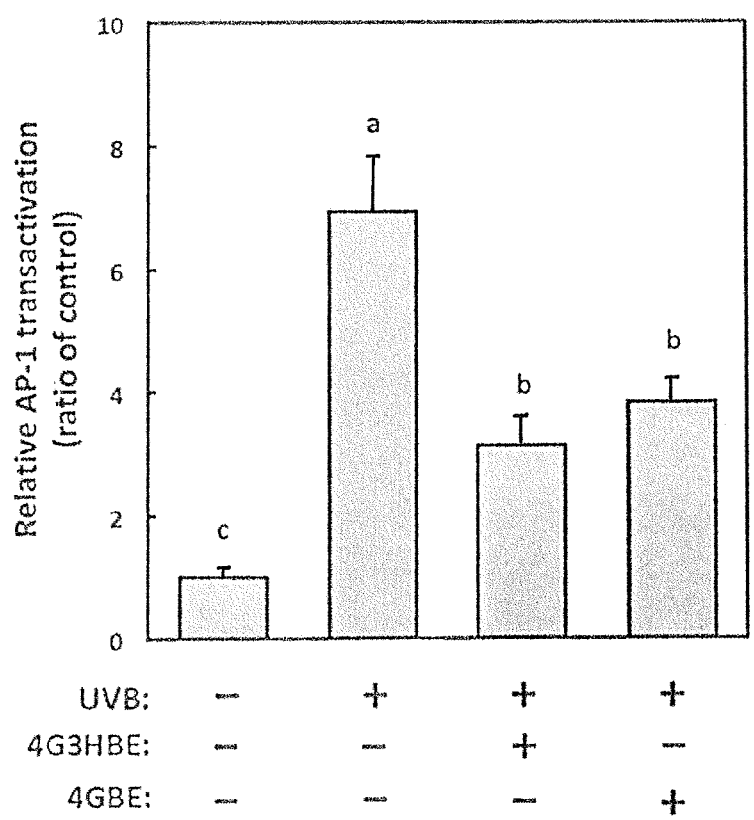
FIG. 5 is a graph for examining AP-1 transactivation.

Referring to FIG. 5, the horizontal axis indicates conditions of the samples and the vertical axis indicates an AP-1 transcriptional ratio with respect to the control. The conditions of the samples refer to the presence/absence of UV-B irradiation ("+": irradiated with UV, "−": not irradiated), the presence/absence of 4G3HBE ("+": presence, "−": absence), and the presence/absence of 4GBE ("+": presence, "−": absence). The control was taken in the absence of UV-B irradiation, in the absence of 4G3HBE, and in the absence of 4GBE, and the AP-1 transcriptional ratio under these conditions was defined as 1.

The AP-1 transcriptional ratio increased about 7-fold by UV-B irradiation, while it was suppressed to about 3- to 4-fold by the presence of 4G3HBE or 4GBE. That is, the AP-1 transactivation was significantly reduced in the cells treated with 4G3HBE or 4GBE.

Effect on Amount of Intracellular Reactive Oxygen Species (ROS)

In the studies of "Antioxidative effect", it was confirmed that 4G3HBE and 4GBE had approximately half of the antioxidation activity of vitamin C. On the other hand, according to "Inhibition of MMP-1 expression" and "Activation of signaling molecules", it was thought that attenuation of the oxidative stress signal was induced by removal of ROS, generated by UV-B irradiation, by the antioxidation ability of 4G3HBE and 4GBE. Thus, the amount of the intracellular reactive oxygen species (ROS) was measured using CM-H$_2$DCFDA, an indicator of ROS.

The NHDF cells ($1.0 \times 10^5$ cells/mL) were cultured to a confluent state. Subsequently, 4G3HBE and 4GBE were each added to the cells at a final concentration of 50 μM, followed by preculturing for 24 hours. CM-H$_2$DCFDA serving as a cell-permeable indicator of reactive oxygen was added to the cells at a final concentration of 10 μM one hour before ultraviolet ray irradiation. Subsequently, the cells were irradiated with UV-B with a light intensity of 25 mJ/cm$^2$ and further cultured for 1 hour in an incubator. Then, fluorescence was measured with an excitation wavelength of 495 nm and a fluorescent wavelength of 530 nm using a multimode microplate reader, Varioscan LUX.

Figure 6:
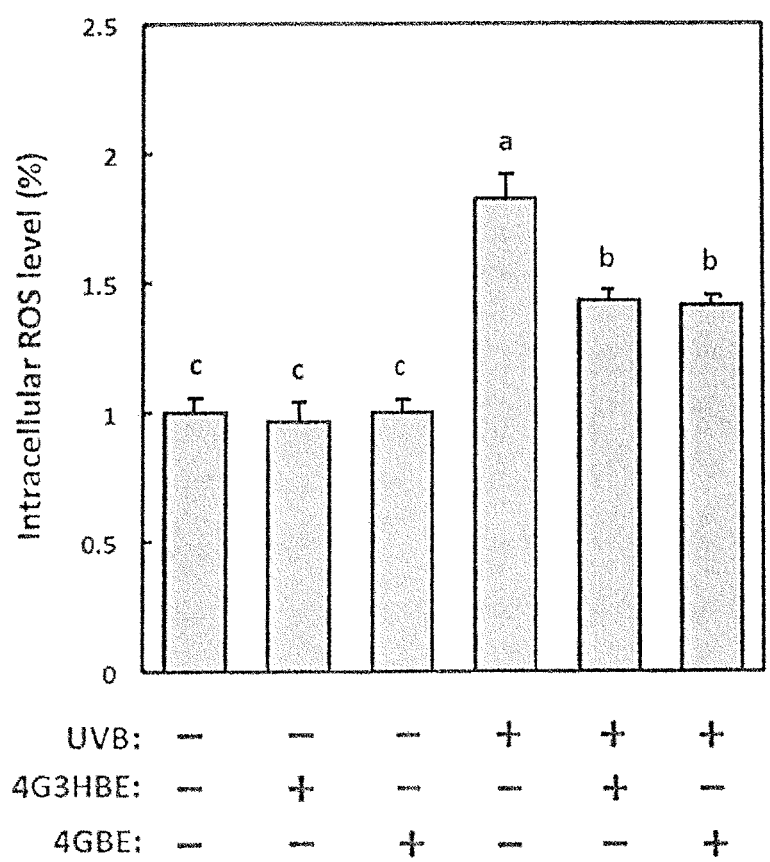
FIG. 6 is a graph for examining an effect on the amount of intracellular reactive oxygen species (ROS).

The result is shown in FIG. 6. Referring to FIG. 6, the horizontal axis indicates conditions of the samples, that is, the presence/absence of UV-B irradiation ("+": irradiated with UV, "−": not irradiated), the presence/absence of 4G3HBE ("+": presence, "−": absence), and the presence/absence of 4GBE ("+": presence, "−": absence). The vertical axis indicates the intracellular ROS level(%).

The amount of the intracellular ROS increased from 1% to about 1.7% by UV-B irradiation. However, it was suppressed to about 1.4% by the presence of 4G3HBE or 4GBE.

Based on the above-mentioned facts, the intracellular ROS level after UV-B irradiation was significantly reduced by 4G3HBE or 4GBE.

Effect on Production of Carbonylated Proteins

The reactive oxygen species (ROS) generated in the cells and tissues non-specifically oxidize nearby proteins. As an oxidatively modified protein, a carbonylated protein is well known. More specifically, the carbonylated protein is a general term for proteins converted to carbonyl derivatives through oxidative modification of amino acids such as proline, arginine, lysine, and threonine in the proteins by ROS. The carbonyl derivatives are chemically stable.

Yellowing in the skin, in particular, yellowing (yellowing and dullness) caused by aging is a common problem related to the skin. Recent studies reveal that carbonylation of proteins in the dermis by a peroxide and the like is a major cause of yellowing. Thus, studies were conducted to determine if antioxidation ability of 4G3HBE and 4GBE isolated from the young watermelon fruit described herein is also effective in treating this "yellowing". This yellowing is a phenomenon of skin aging.

More specifically, the NHDF cells ($1.0 \times 10^5$ cells/mL) were cultured to a confluent state and 4G3HBE and 4GBE were each added to the cells at a final concentration of 50 μM or 100 μM, followed by preculturing for 24 hours. Subsequently, the cells were irradiated with UV-B with a light intensity of 25 mJ/cm$^2$ and evaluated according to Millipore OxyBlot™ Protein Oxidation Detection Kit.

Figure 7:
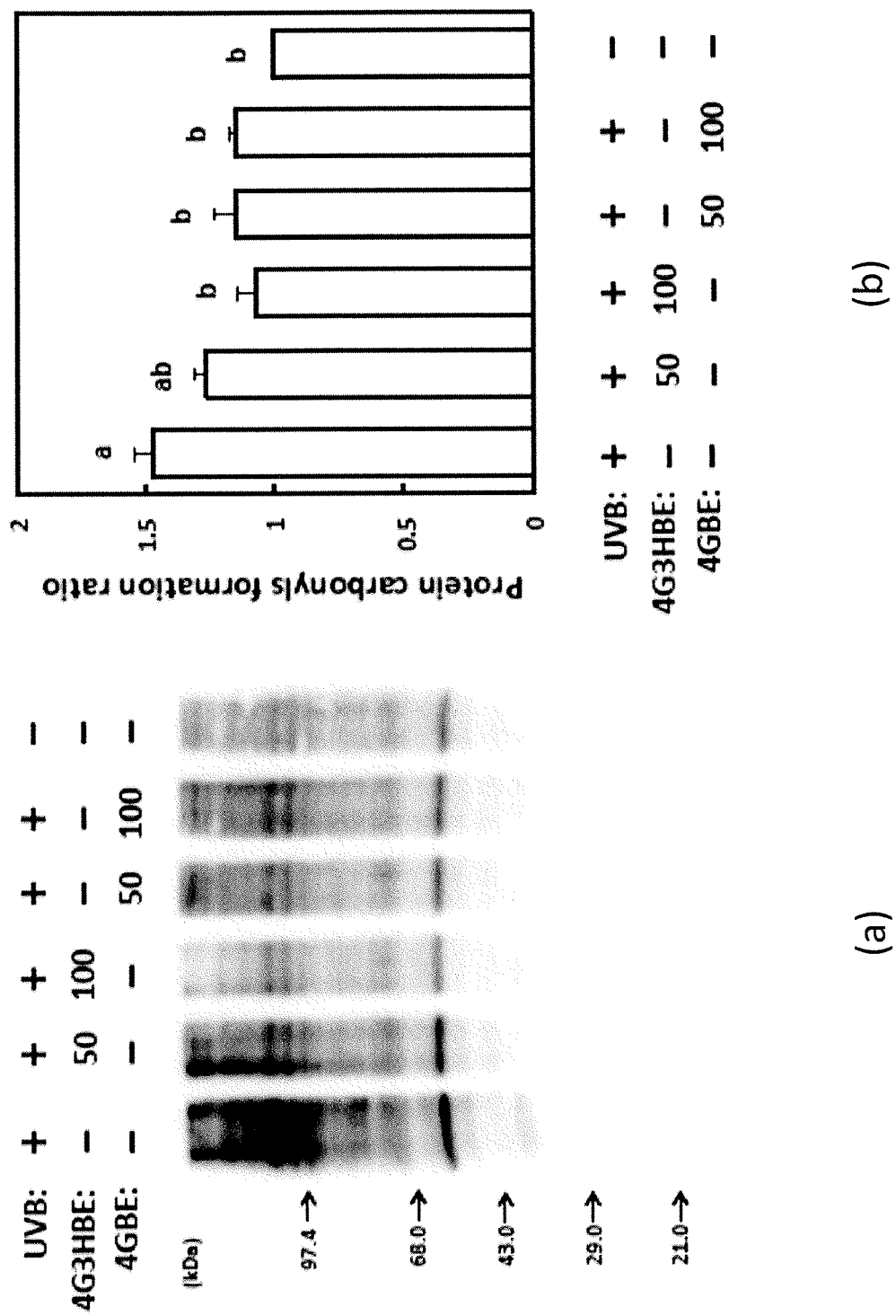
FIG. 7 shows (a) a result of western blotting for examining an effect on the production of carbonylated proteins and (b) a graph showing a result of a densitometry analysis.

The result is shown in FIG. 7. FIG. 7($a$) is an image of a western blot obtained under the conditions of the samples as indicated. The vertical axis indicates kDa. Further, FIG. 7($b$) is a result of the densitometry analysis. Referring to FIG. 7($b$), the horizontal axis indicates the conditions of the samples and the vertical axis indicates a ratio of the carbonylated proteins with respect to the control.

When a control was taken in the absence of UV-B irradiation, in the absence of 4G3HBE, and in the absence of 4GBE, the ratio of carbonylated proteins produced in the control was 1%. The carbonylated proteins increased to about 1.5% by UV-B irradiation. On the other hand, the carbonylated proteins were suppressed to about from 1.1% to 1.2% by the presence of 4G3HBE or 4GBE. As a result, the amount of the carbonylated proteins in the cells treated with 4G3HBE or 4GBE was significantly reduced.

As described above, a pharmaceutical composition including at least one of the novel substances 4G3HBE and 4GBE can be described as an antioxidative pharmaceutical composition, and a processed food composition including at least one of the novel substances 4G3HBE and 4GBE can be described as an antioxidative processed food composition. Further, a skin anti-aging composition can be constituted by substances that include at least one of the novel substances 4G3HBE and 4GBE.

INDUSTRIAL APPLICABILITY

The novel compounds 4G3HBE and 4GBE derived from a watermelon according to the present invention are compounds that have an antioxidative effect and are expected to provide the effect of maintaining homeostasis under various conditions by removing reactive oxygen.

The invention claimed is:

1. A skin anti-aging composition comprising:

at least one of compounds represented by the following formula (1) and formula (2):

[Chemical Formula 103]

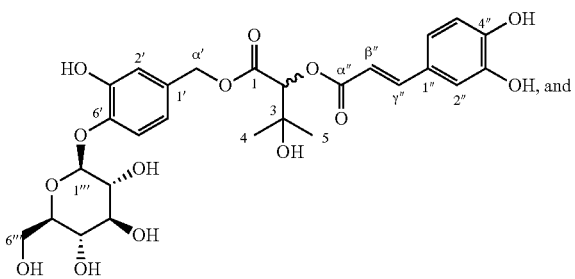

(1)

[Chemical Formula 104]

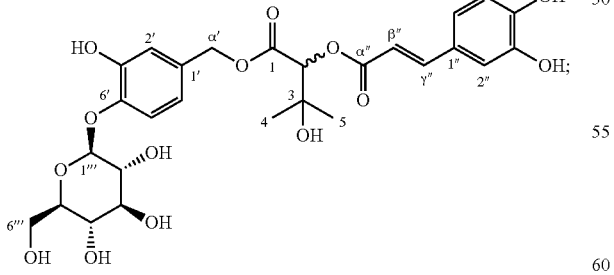

(2)

and at least one of collagen and hyaluronic acid.

2. A pharmaceutical composition for suppressing the expression of MMP-1, the composition comprising:

at least one of compounds represented by the following formula (1) and formula (2):

[Chemical Formula 105]

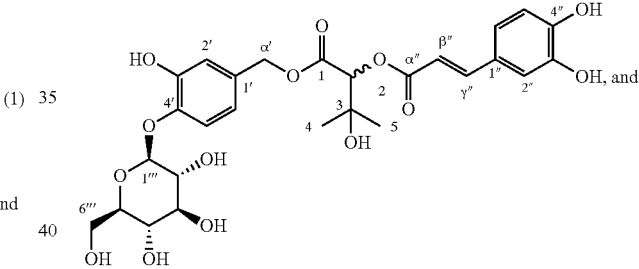

(1)

[Chemical Formula 106]

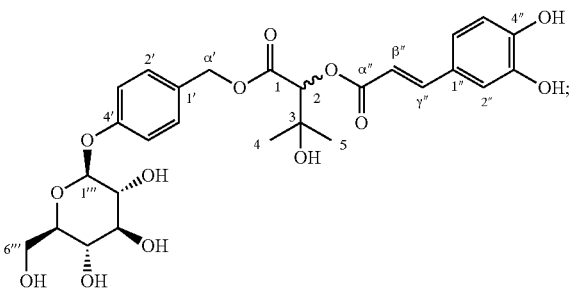

(2)

an excipient; and a capsule for enclosing the compound and the excipient.

3. A method of treating yellowing in the skin, comprising:

administering an effective amount of at least one of compounds represented by the following formula (1) and formula (2):

[Chemical formula 107]
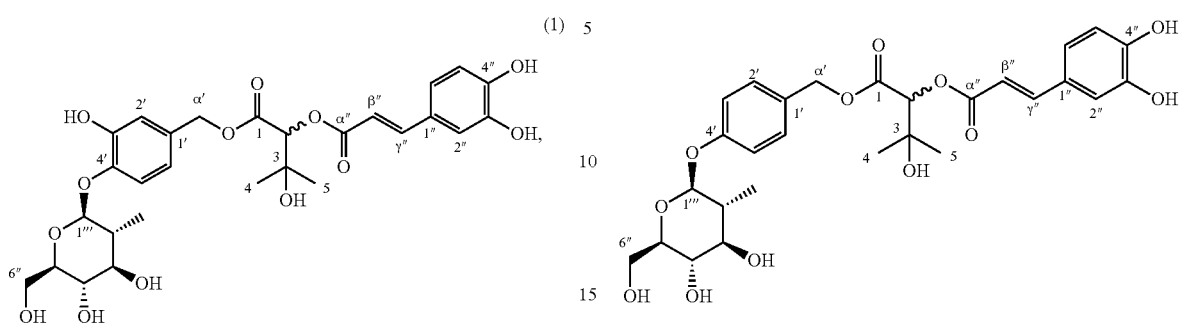
and
[Chemical formula 108]
to a patient having yellowing caused by aging in the skin.
* * * * *

SEQUENCE LISTING

```
<160> NUMBER OF SEQ ID NOS: 6

<210> SEQ ID NO 1
<211> LENGTH: 19
<212> TYPE: DNA
<213> ORGANISM: Artificial Sequence
<220> FEATURE:
<223> OTHER INFORMATION: MMP-1 forward primer

<400> SEQUENCE: 1
ccaaatgggc ttgaagctg                                             19

<210> SEQ ID NO 2
<211> LENGTH: 24
<212> TYPE: DNA
<213> ORGANISM: Artificial Sequence
<220> FEATURE:
<223> OTHER INFORMATION: MMP-1 reverse primer

<400> SEQUENCE: 2
ggtatccgtg tagcacattc tgtc                                       24

<210> SEQ ID NO 3
<211> LENGTH: 22
<212> TYPE: DNA
<213> ORGANISM: Artificial Sequence
<220> FEATURE:
<223> OTHER INFORMATION: MMP-3 forward primer

<400> SEQUENCE: 3
tttccaggga ttgactcaaa ga                                         22

<210> SEQ ID NO 4
<211> LENGTH: 21
<212> TYPE: DNA
<213> ORGANISM: Artificial Sequence
<220> FEATURE:
<223> OTHER INFORMATION: MMP-3 reverse primer
```

```
<400> SEQUENCE: 4
aagtgcccat attgtgcctt c                                        21

<210> SEQ ID NO 5
<211> LENGTH: 20
<212> TYPE: DNA
<213> ORGANISM: Artificial Sequence
<220> FEATURE:
<223> OTHER INFORMATION: GAPDH forward primer

<400> SEQUENCE: 5
gcaccgtcaa ggctgagaac                                          20

<210> SEQ ID NO 6
<211> LENGTH: 19
<212> TYPE: DNA
<213> ORGANISM: Artificial Sequence
<220> FEATURE:
<223> OTHER INFORMATION: GAPDH reverse primer

<400> SEQUENCE: 6
tggtgaagac gccagtgga                                           19
```